(12) United States Patent
Ootomo et al.

(10) Patent No.: US 7,222,021 B2
(45) Date of Patent: May 22, 2007

(54) OPERATOR GUIDING SYSTEM

(75) Inventors: Fumio Ootomo, Tokyo (JP); Akio Kimura, Tokyo (JP); Kaoru Kumagai, Tokyo (JP); Kazuki Osaragi, Tokyo (JP); Kunihiro Hayashi, Tokyo (JP)

(73) Assignee: Kabushiki Kaisha Topcon, Tokyo (JP)

(*) Notice: Subject to any disclaimer, the term of this patent is extended or adjusted under 35 U.S.C. 154(b) by 298 days.

(21) Appl. No.: 10/232,839

(22) Filed: Sep. 3, 2002

(65) Prior Publication Data

US 2003/0065446 A1    Apr. 3, 2003

(30) Foreign Application Priority Data

Sep. 7, 2001    (JP)    ............... 2001-272126

(51) Int. Cl.
*G01V 3/38*    (2006.01)
(52) U.S. Cl. ............................ 702/5; 348/36
(58) Field of Classification Search .............. 702/5; 348/36
See application file for complete search history.

(56) References Cited

U.S. PATENT DOCUMENTS

| | | | | |
|---|---|---|---|---|
| 5,166,878 | A | * | 11/1992 | Poelstra ...................... 701/200 |
| 5,280,744 | A | * | 1/1994 | DeCarlo et al. ............ 89/41.19 |
| 5,337,149 | A | * | 8/1994 | Kozah et al. ............... 356/601 |
| 5,672,820 | A | * | 9/1997 | Rossi et al. ................ 73/178 R |
| 5,739,785 | A | | 4/1998 | Allison et al. |

(Continued)

FOREIGN PATENT DOCUMENTS

DE    199 22 321 A1    11/2000

| | | | |
|---|---|---|---|
| EP | 0 218 750 A1 | 4/1987 |
| JP | 9-159449 A | 6/1997 |
| WO | WO 95/33974 A1 | 12/1995 |

OTHER PUBLICATIONS

Patent Abstract of Japan, vol. 1999, No. 5, May 31, 1999, JP 11 030521, Feb. 2, 1999.

*Primary Examiner*—Marc S. Hoff
*Assistant Examiner*—Anthony Gutierrez
(74) *Attorney, Agent, or Firm*—Foley & Lardner LLP

(57)    ABSTRACT

A base station is installed in a predetermined area where a large number of target points are studded around the station. When the operator moves a mobile station around the base station, display means is provided for both or either of the base station that guides the operator and the mobile station, and a display screen of the display means displays 2 kinds of a Forward (foreground) mode and a Back (background) mode. In the Forward (foreground) mode, the display screen of the display means displays a landscape in a forward direction (opposite direction to the mobile station by 180° when seen from the base station) of the operator (mobile station) when the operator sees the base station from the current position of the mobile station, or from the next target point if the operator reaches the next target point. In the Back (backward) mode, the display screen of the display means displays the landscape in a backward direction (direction of the operator and the mobile station when seen from the base station) of the operator (mobile station) when the operator sees the base station from the current position of the mobile station, or from the next target point if the operator reaches the next target point. The relationship between the mobile station and the next target point is displayed on an imaginary landscape in an imaginary manner so that the operator can see the direction and distance for movement.

24 Claims, 6 Drawing Sheets

U.S. PATENT DOCUMENTS

| | | | |
|---|---|---|---|
| 5,964,298 A * | 10/1999 | Greenspun | 172/4.5 |
| 5,999,211 A * | 12/1999 | Hedges et al. | 348/144 |
| 6,023,588 A * | 2/2000 | Ray et al. | 396/20 |
| 6,034,722 A | 3/2000 | Viney et al. | |
| 6,052,083 A * | 4/2000 | Wilson | 342/357.17 |
| 6,094,625 A * | 7/2000 | Ralston | 702/150 |
| 6,323,858 B1 * | 11/2001 | Gilbert et al. | 345/419 |
| 6,335,754 B1 * | 1/2002 | Endo et al. | 348/37 |
| 6,337,683 B1 * | 1/2002 | Gilbert et al. | 345/418 |
| 6,417,836 B1 * | 7/2002 | Kumar et al. | 345/156 |
| 6,526,352 B1 * | 2/2003 | Breed et al. | 701/213 |
| 6,563,529 B1 * | 5/2003 | Jongerius | 348/36 |
| 6,563,574 B2 * | 5/2003 | Ohtomo et al. | 356/141.1 |
| 6,583,815 B1 * | 6/2003 | Driscoll et al. | 348/211.3 |
| 6,624,846 B1 * | 9/2003 | Lassiter | 348/211.4 |
| 6,759,979 B2 * | 7/2004 | Vashisth et al. | 342/357.13 |
| 2002/0075258 A1 * | 6/2002 | Park et al. | 345/419 |
| 2003/0063133 A1 * | 4/2003 | Foote et al. | 345/850 |
| 2004/0085455 A1 * | 5/2004 | Silverstein | 348/211.4 |

\* cited by examiner

OPERATOR GUIDING SYSTEM

BACKGROUND OF THE INVENTION

1. Technical Field of the Invention

The present invention relates to an operator guiding system in a pile-driving operation, a positioning operation, or the like.

2. Related Art

FIG. 7 shows a schematic view of a conventional operator guiding system in the pile-driving operation or the positioning operation.

Firstly, a base station 71 is arranged at a good position for overlooking the entire operation site such that a large number of target points (target points where pile-driving or positioning should be performed) are studded around the base station 71 (regularly composed of an instrument main body supported by a tripod) that measures positional coordinates. When the relation among the base station 71, a mobile station 72 that an operator possesses to carry, and particularly the next target point 73 among a large number of the target points for the pile-driving, the positioning operation, or the like, is as shown in FIG. 7, the operator has conventionally been guided onto a straight line connecting the base station 71 and the next target point 73. Specifically, display means of the mobile station displays the direction of the straight line when the operator faces the direction of the base station, or the base station collimates the next target point direction, the operator visually refers to the collimation direction, and thus the operator is guided onto the straight line. In this case, when moving most efficiently, the operator proceeds to ①, that is, substantially perpendicular to the straight line, and reaches ② point on the straight line. After the operator has reached ②, the base station 71 measures a current position (three dimensional coordinates) of the mobile station 72, and displays the direction of the next target point on the straight line (forward/backward direction to the direction of the base station, for example) and a distance to move, for the operator. Thereafter, the operator has proceeded to the direction of ③ toward the next target point 73 along the foregoing straight line, and has reached the next target point 73.

The operator, when moving to the straight line connecting the base station and the target point, needs to make sure whether or not he/she has reached the straight line by constantly looking into the display of the display means of the mobile station and the collimation direction by the base station, which has been complicate as an operation, and the operator has been in danger of falling when moving on unleveled ground before construction. Further, when moving on the straight line for the target point after reaching the straight line, the operator always has needed to be careful not to go off from the straight line.

Furthermore, since the operator needs to move on a route passing ①, ② and ③ until he/she reaches the target point, both moving distance and time have taken longer, and it has been very operation-inefficient.

When the collimation direction of the base station is needed to confirm visually, there have been cases where such an operation was difficult due to a visual power of the operator.

SUMMARY OF THE INVENTION

The object of the present invention is to provide an operator guiding system that makes the positioning operation, the pile-driving operation, or the like by the operator easier.

A plurality of the target points are set in a predetermined area according to a construction plan. An example of the target points to be set will be cited.

(1) When the Target Points are Positions of Driving Piles

A construction plan is previously decided when a civil engineering operation is performed in a predetermined area.

Construction is performed based on the construction plan, and piles are installed at predetermined offset positions for reference during the construction operation. This is called a pile-driving operation.

The three-dimensional arrangement positions (horizontal plane coordinates, height) of the piles are set at the time of planning the construction.

(2) When the Target Points are Positions where Positioning is Performed

The target points are positions to perform the positioning operation in order to grasp the condition of current ground level for the construction plan or to confirm construction status.

Further, during the positioning operation at an arbitrary position before the construction plan, the three-dimensional position of a point where positioning has been performed can be displayed.

The base station is installed at an appropriate position (position from which all target points can be collimated, substantial center, or the like) for the target points.

The base station is constituted so as to serve as a positional coordinates measurement unit. Primary constitutions are as follows.

Imaging means (main body)

Angle measurement means (horizontal angle, altitude angle) and imaging means: They are capable of detecting optical axis directions thereof.

Distance measurement means (light wave distance measurement): It is provided at an arbitrary point within the field of vision of the imaging means.

Storage means (photographed image, construction plan data)

Arithmetic processing means (positional coordinates association processing, or the like on the photographed image)

Communication means (transmission, transmission/receiving)

Unit position measurement means (GPS+machine height measurement means): It measures an optical axis height of the imaging means.

Although it is preferable to process the construction plan data in the mobile station, it may be processed in the base station.

An image photographed by the imaging means is associated with an optical axis direction of the imaging means by the angle measurement means and the arithmetic processing means to form landscape data from the base station in a predetermined direction.

Further, the landscape data obtained with regard to a plurality of horizontal angles are synthesized based on the horizontal angles and altitude angles corresponding to the image, and panoramic landscape data up to 360° can be formed.

In the case where a target of retroreflection member (such as prism) is detected in a landscape image, the three-dimensional positional coordinates of the target can be obtained based on corresponding horizontal angle, the altitude angle and the distance to the target measured by the distance measurement means. The storage means stores the landscape data, the three-dimensional positional coordinates, and the like obtained. Alternatively, they are transmitted to the mobile station via the communication means to display for the operator.

Furthermore, the base station may be provided with unit position measurement means (machine height measurement means, GPS, or the like) for measuring the installed position. The optical axis height of the imaging means can also be obtained from measurement values by the unit position measurement means.

Still further, the base station is provided with display means capable of displaying the foregoing landscape data, or the like, so that correspondence between photographed landscape and the horizontal angle in the landscape data can be checked as well.

The mobile station is one that the operator possesses to carry in a predetermined area where the base station is installed based on the construction plan. A reference position mark showing the reference position of measurement coordinates is arranged in the mobile station. Primary constitutions are as follows.

Target: It has the retroreflection prism or a reflector. It is attached to the mobile station directly or via an adapter or a ball.

Communication means (receiving, transmission/receiving)

Display section (guidance display to the operator)

Measurement instruction means (it instructs measurement to the base station in the case of arbitrary point measurement. It is provided at a lower stage of a display screen.)

Storage means (construction plan data, landscape image)

Arithmetic processing means (association processing of positional coordinates data, image data, or the like)

A plurality of mobile stations may be capable of moving simultaneously.

Although it is preferable that the mobile station performs creation of the landscape data and processing of the construction plan data, the arithmetic processing means of the base station may perform such processing.

On such an occasion, the photographed image and angle measurement data for creating the landscape data, or the construction plan data are transmitted to the mobile station via the communication means. Since the construction plan data is previously decided, it may be stored in the mobile station in advance or may be stored in a storage device (such as memory card) attachable to the mobile station.

The landscape displayed on the display means is largely 2 kinds.

Displaying the landscape that the operator (mobile station) sees in the direction of the base station (when seen from the base station, it is a direction that makes 180° with a horizontal angle direction where the mobile station is detected) from a predetermined position is referred to as a Forward (foreground) mode, and displaying the landscape that the operator (mobile station) sees in the direction that makes 180° with the direction of base station (when seen from the base station, it is a horizontal angle direction where the mobile station is detected) from the predetermined position is referred to as a Back (background) mode.

Preferably, when the display means displays the landscape in which the operator sees the base station from the current position (mobile station) in the Forward (foreground) mode, the current position of the operator from which the base station can be seen is arranged at the center of a displayed landscape in the display screen and its collimation line is displayed in a perpendicular (vertical) direction to the center from right and left of the display screen. At this point, it is assumed that the base station is seen from the next target point, and a target line showing that the operator sees the base station from the next target point is displayed in the display screen in the perpendicular (vertical) direction at the central position of the displayed landscape of the direction where the operator sees the base station. As a result, the target line is displayed in parallel with the collimation line on its left or right collaterally.

In addition, by displaying the target line so as to arrange it at the center of the displayed landscape of the display screen, the operator can accurately recognize the landscape when he/she sees the base station at the point of arrival at the target point.

Preferably, when displaying the landscape where the current position of the operator (mobile station) is seen from the base station on the display means in the Back (background) mode, the position where the current position of the operator is seen from the base station is arranged at the center of the displayed landscape on the display screen and its collimation line is displayed in the perpendicular (vertical) direction to the center from right and left of the display screen. At this point, it is assumed that the next target point is seen from the base station, and a target line showing that the operator sees the next target from the base station is displayed in the display screen in the perpendicular (vertical) direction at the central position of the displayed landscape of the direction where the operator is seen from the base station. As a result, the target line is displayed in parallel with the collimation line on its left or right collaterally.

In addition, by displaying the target line so as to arrange it at the center of the displayed landscape of the display screen, the operator can accurately recognize the landscape that he/she sees with the base station behind him/her at the point of arrival at the target point.

It is preferable to display an arrow according to a direction from the collimation line of the displayed landscape to the target line (from the current position of the mobile station to the next target point) in the display screen.

Furthermore, it is preferable to display a scale of distance or a scale of the horizontal angles using the base station as a reference on the displayed landscape in a superposing manner.

Before the operator (mobile station) reaches the next target point, he/she can easily confirm the landscape from the next target point by the landscape in the display screen in an imaginary manner. By doing so, the operator can confirm with his/her own eyes that he/she is at the next target point when he/she actually reaches the next target point.

By seeing the direction of the base station when the operator moves from the previous target point to the next target point, he/she can accurately predict the relation between the next target point and the previous position due to the landscape that he/she actually sees and the transition of displayed landscape.

Based on the positional coordinates data of the base station and the mobile station and target point positional coordinates data in the construction plan, the display means artificially displays a relative positional relation among the base station, the mobile station and the next target point when the operator sees the base station from the current position (mobile station) in a very simplified three-dimensional shape, other than the foregoing displayed landscape. This artificial landscape displays the base station, the mobile station (operator) and the target points in characters or reference codes such as small circles and squares, and also displays the direction and the distance from the current position of the operator (mobile station) to the next target point in an orientation and a length of an arrow, for example.

Furthermore, by displaying a numerical value corresponding to the distance in addition to the arrow regarding the distance, the operator can grasp the distance more specifically.

The artificial landscape is displayed as a bird's eye image around a direction where the base station is seen from the current position of the operator (mobile station), that is, a central position of a straight line passing the current position and the base station. In addition, the artificial landscape shows at least the position of the base station, the current position of the mobile station (operator), and the position of the next target point, and displays the arrow corresponding to the direction and the distance from the mobile station to the next target point between the both positions. The distance is shown by a numeral near the arrow.

The artificial landscape displays the horizontal angles at the base station in a predetermined distance. Specifically, the angles are radially displayed around the base station. Further, the horizontal angle corresponding to the direction of the next target point is displayed as the next target horizontal angle such that it can be discriminated from other horizontal angles.

If the landscape display and the artificial landscape display are collaterally displayed in upper and lower portions on the same screen, arranging the target line of the landscape image on an extension of the next target horizontal angle on the artificial landscape display makes it easier to recognize the position of the operator's next target point and the landscape from the position.

It is preferable to display the target points in 3 kinds, that is, they are classified in the next target point, the target point before processing, and the target point where processing has performed.

Although the order of the target points to be processed may be previously programmed, it is preferable that the operator is capable of specifying the next target points on the display means. For example, the operator specifies it by touching a desired position on the display screen. Then, it is further preferable to blink the next target point on and off to discriminate it from the other target points.

By displaying the direction and the distance from the current position of the operator to the next target point spatially or three-dimensionally on the display means, the operator can grasp the next target points more specifically and intuitively. Particularly, the operator can take the next action without hesitation when they are displayed by the arrow that corresponds to the direction and the distance to proceed.

Still further, the position of the target point based on the construction plan data can be superposed to display on the landscape display.

At this point, the target point can be displayed by associating the vertical direction on the landscape image with the distance based on the positional coordinates of the base station and angle measurement by the imaging means or a measurement result by the distance measurement means.

The operator can easily grasp progress status of the operation when the target points are displayed in forms according to the processing status, that is, when the target point before processing, the target point where processing has performed, and target point to process next are separately displayed, for example.

In addition, by seeing the direction of the base station when the operator moves, he/she can easily predict the next target point from the current position by the transition of the landscape.

Describing the Background mode display in detail, the display means displays the landscape when the direction of the mobile station at the current position is seen from the base station. Then, similar to the Foreground mode, the position where the mobile station (detected by the target) is seen from the base station is displayed at the center of the display screen, and the target line is displayed in the direction of the next target point seen from the base station. Further, the arrow according to the direction and the angle is displayed between the detected mobile station and the next target point, and the distance from the mobile station to the next target point is displayed in the numeral near the arrow. By displaying the next target point in this manner, the operator can easily grasp the progress status of the operation.

It is preferable to display the horizontal angles using the base station as a reference on the displayed landscape in the display screen.

Seeing the base station direction when the operator moves makes it easy to predict the position of the next target point by the transition of the landscape.

Preferably, both display screens of the base station and the mobile station are designed to display the relative positional relation between the mobile station at the current position and the target point in the artificial landscape. Moreover, the display screens are designed to display such an image every time the next target point is updated.

Although the landscape display for the operator can be arbitrarily selected, it may be selected by automatic switching such that the Forward (foreground) mode is displayed when the positional coordinates of the next target point is in the base station direction seen from the mobile station and the Back (background) mode is displayed when it is in the opposite direction to the base station.

With the conventional method shown in FIG. 7, when directly instructing the operator of the position of the target point, it has been impossible to directly instruct him/her of a direction to move without detecting a direction where the operator faces. For this reason, the operator has been guided on the line passing the base station and the next target point (direction where the next target point is collimated from base station), the current position has been measured when the operator reached the line, and an instruction as to a direction to move on the line has been given.

In the present invention, by displaying the landscape image corresponding to the relative positional relation between the current position of the operator (mobile station) and the next target point, the direction and the distance from the current position to the next target point can be directly displayed.

When different display is performed according to each status of "unprocessed", "to be processed next" and "processed" in displaying the target point where the pile driving or the positional measurement is performed, particularly when clearly discriminating the target point to be processed next from the other target points by blinking on and off or the like to call attention, the operator can visually confirm all target points within the field of vision and the status of each target point. Therefore, the direction and the distance to move can be easily understood when the instruction regarding the position of the next target point is given to the operator at work.

A setting method of the base station is arbitrary, and the present invention is not limited to a particular setting method. Positional survey by GPS can be used other than setting by a conventional control survey.

Additionally, it is preferable to three-dimensionally display the position of the base station, the position of the mobile station, and the position of the target point stereoscopically and spatially. It is desirable that the positional display of these on the screen be a projected position on a horizontal plane.

Display contents of the image of the displayed landscape may be partially different when it is displayed with the horizontal angles and the altitude angles in a superposed manner and when it is displayed on the artificial landscape.

Preferably, display of Up and Down regarding a height from the current position to the next target point is performed. Accordingly, the operator easily goes to the next target point.

Further preferably, the relative positional relation between the height of the target point and the height of the current position is displayed in a figure.

This makes it easy to install a pile with an accurate height in the pile-driving operation, or to confirm the height of the pile installed.

A specific numerical value is additionally displayed regarding the relative positional relation between the next target point and the current position, particularly the distance from the current position to the next target point and a vertical interval of the current position to the target point height.

This is because there are cases where the distance and the vertical interval are easily grasped exactly by the numerical value.

Preferable processing flow will be as follows.

Automatically detecting (automatic positioning) the target of the mobile station→Recording the positional coordinates data→Correcting an offset position→Comparing with the positional coordinates of the next target point→Associating with the landscape image→Transmitting to the mobile station→Displaying on the display screen.

The image photographed by the imaging means is associated with the optical axis direction of the imaging means by the angle measurement means and the arithmetic processing means to form landscape data from the base station in a predetermined direction.

Further, the landscape data obtained with regard to a plurality of horizontal angles are synthesized based on the horizontal angles and the altitude angles corresponding to the image, and panoramic landscape data up to 360° can be formed.

In the case where the target of retroreflection member (such as prism) is detected in the landscape image, the three-dimensional positional coordinates of the target can be obtained based on corresponding horizontal angle, altitude angle and the distance to the target measured by the distance measurement means. The storage means stores the landscape data, the three-dimensional positional coordinates, and the like obtained. Alternatively, they are transmitted to the mobile station via the communication means to display for the operator.

Furthermore, the base station may be provided with the unit position measurement means (machine height measurement means, GPS, or the like) for measuring the installed position. The optical axis height of the imaging means can also be obtained from measurement values by the unit position measurement means.

Still further, the base station is provided with display means capable of displaying the foregoing landscape data, or the like, so that correspondence between photographed landscape and the horizontal angle in the landscape data can be checked as well.

The mobile station is one that the operator possesses to carry in a predetermined area where the base station is installed based on the construction plan. Its primary constitution is as follows.

It is preferable that the mobile station processes the construction data, but the base station may process it.

Although it is preferable that the base station performs creation of the landscape data and processing of the construction plan data, the arithmetic processing means of the mobile station may perform the processing.

At this point, the photographed image and the angle measurement data for creating the landscape data, or the construction plan data is transmitted to the mobile station via the communication means. Since the construction plan data is previously decided, it may be stored in the mobile station in advance or may be stored in the storage device (such as memory card) attachable to the mobile station.

The landscape displayed on the display means is largely 2 kinds.

Displaying the landscape that the operator (mobile station) sees in the direction of the base station (when seen from the base station, it is a direction that makes 180° with a horizontal angle direction where the mobile station is detected) from a predetermined position is referred to as the Forward (foreground) mode, and displaying the landscape that the operator (mobile station) sees in the direction that makes 180° with the direction of the base station (when seen from the base station, it is a horizontal angle direction where the mobile station is detected) from the predetermined position is referred to as the Back (background) mode.

Further, it is preferable that the display means has a function to obtain image data and three-dimensional data, which are associated with an azimuth angle (horizontal angle, altitude angle) of a floodlight, by the communication means. In this case, a reflector to be recognized by the floodlight is provided. Then, the display means displays the image data and positional information attached thereto. Moreover, input means for operating the display, a CPU and a memory are provided. Existing PDA, mobile terminal, or the like may be also provided. In any case, it is preferable that the display means has a function to specify an image and a position for the landscape seen from the operator's (mobile station) own position through the base station, based on the image data and the three-dimensional data obtained by the communication means.

It is also preferable to provide means (such as ten key, touch panel, and file data) for inputting an objective position for the display means.

The display means preferably has a function that the operator arbitrarily scrolls the image data obtained by the communication means and to confirm the positional relation between the mobile station and the next target point.

Furthermore, it is preferable in the display means that the objective position is marked as a virtual position in the image data based on the image data obtained by the communication means and objective position information obtained by the input means, and the target point can be discriminated by a color or a mark shape due to its status such as "downloaded".

Still further, it is preferable to perform a virtual three-dimensional display by superposing the image data, an azimuth angle line, and a virtual horizontal distance mesh.

The base station is preferably provided with the imaging means to display the coordinates data in association with the photographed image data. It is preferable that the imaging means is unified with the coordinates measurement unit and it forms a panoramic photographed image where a plurality of photographed images are synthesized.

It is preferable that the display means has a function to virtually create a three-dimensional display and a function to associate and synthesize the photographed image with its virtual three-dimensional image.

A depth direction position h on the image in the function to synthesize the coordinates data with the photographed image data is calculated by the following expression based on distance data L of the coordinates data, a height H of a machine main body of the base station, and a focal distance f of the imaging means.

$$H=Hf/L$$

The height H of the machine main body is calculated using a default value (1.5 m for example). The height H of the machine main body is actually measured and input.

It is preferable that the base station has a function to transfer the photographed image to the display means of the mobile station by communication means (such as optical communication and radio communication) or a storage medium (such as compact flash (registered trademark) memory and SD chip). Then, the communication means transmits the coordinates data measured to the display means of the mobile station.

The system of the present application is also effective for a positioning operation at an arbitrary position other than guidance to the target point. In this case, by displaying the positional coordinates measured on the artificial landscape display or the landscape image, the operator can perform operation while exactly grasping the relative positions of places where he/she has performed the positioning operation.

In other words, an efficient positional operation without unbalanced positioning places can be performed.

Accordingly, insufficient data after operation due to shortage of positioning points and fatigue of the operator due to an excessive positioning operation can be prevented.

BRIEF DESCRIPTION OF THE DRAWINGS

The preferred embodiments of the present invention will be described with reference to the drawings.

PREFERRED EMBODIMENTS OF THE INVENTION

Figure 1:
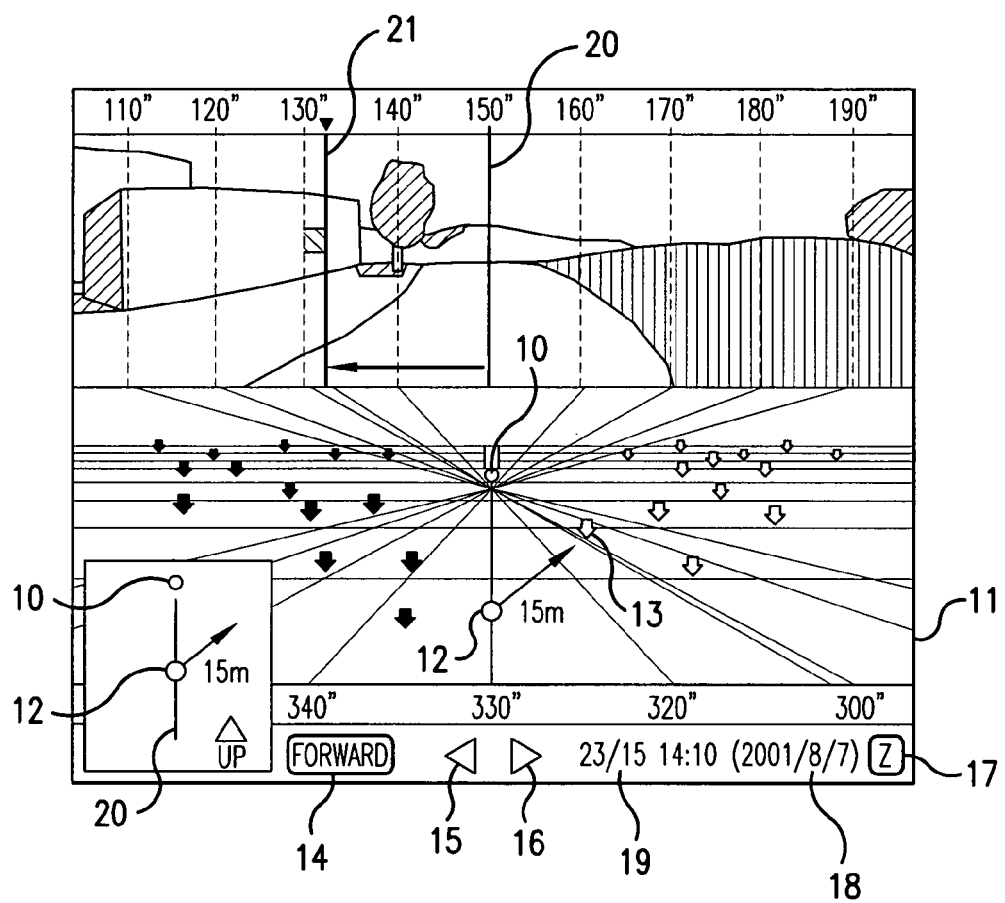
FIG. 1 shows a display mode example of the display screen of the mobile station according to the present invention. Particularly, it shows an example of the Forward (foreground) mode (an example of displaying an image of the landscape when the operator (mobile station) sees in the base station direction and an image of the artificial landscape simultaneously).

FIG. 1 shows an example of the display mode of the display means of a mobile station 12.

Particularly, FIG. 1 shows an example of the Forward (foreground) mode display, in which the image of the landscape when the operator sees in the direction of a base station 10 from the mobile station 12 that he/she possesses to move and the image of the artificial landscape are simultaneously displayed. The image of the artificial landscape is displayed in a small rectangle at the lower left corner of a display screen 11.

In FIG. 1, the next target points positions in a middle region between the current position of the operator (mobile station 12) and the base station 10.

A plurality of target points are shown by downward arrows. There exist 3 kinds of arrows showing the target points, where an outline arrow denotes an unprocessed target point, a bold outline arrow denotes a target point to be processed next, and a black arrow denotes a processed target point. The target point to be processed next is blinking on and off. Alternatively, it may be in a bright color different from the other arrows, which is red, yellow, or the like, for example.

The base station 10 is provided at an appropriate position (near the center, for example) in relation to the 3 kinds of target points.

The display position of the base station 10 within the display screen 11 is on a line passing the center from right and left in vertical directions.

Figure 2:
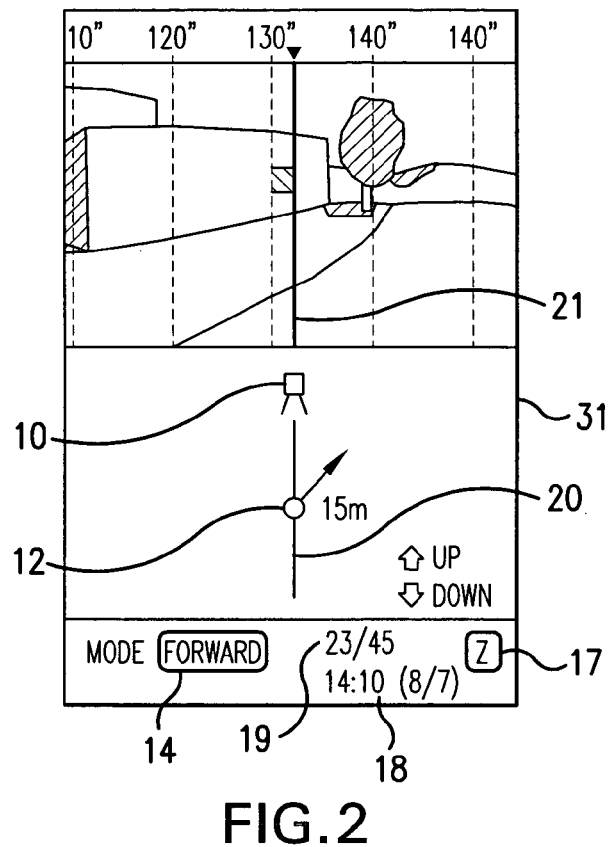
FIG. 2 shows another display mode example of the display screen of the mobile station according to the present invention.

FIG. 2 shows another example of the display mode of the display means of the mobile station.

Particularly, FIG. 2 simultaneously shows the landscape image (upper section) seen from the next target point 18 in the direction of the base station 10, with the target line at the center, and the direction and the distance to the next target point when the operator (mobile station) faces in the base station direction from the current position.

The image on the upper section of FIG. 2 is an image that the landscape image of FIG. 1 is cut to set the target line at the center.

The image of a lower section displays the direction from the current position to the next target point, which is found based on the positional coordinates of the current position of the operator and the positional coordinates of the next target point, in an arrow, and the distance in a numeral or in a length of the arrow.

In the case of the Forward (foreground) mode regarding within a horizontal plane, the direction of the arrow when the operator faces the direction of the base station 10 is displayed in an arrow extending from the mobile station 12 showing the current position, and an upward (UP) or downward (DOWN) height regarding the vertical interval is displayed on the same screen.

The image of a display screen 21 in FIG. 1 is relatively detail, while the image of a display screen 31 shown in FIG. 2 is the simplest possible one where recognition is easy.

It is preferable that data for forming the images of FIGS. 1 and 2 is transmitted constantly or in every predetermined time (or by operating the display means of the mobile station 12 if necessary) between the base station 10 and the mobile station 12 by the communication means to update the data.

In the Forward (foreground) mode display of FIG. 1, there are provided a mode switch button 14, a left scroll button 15, a right scroll button 16, a zoom (display switching) button 17, a time display section 18, and the like. Furthermore, a target point display section 19 displays the target point to be processed next (23rd target point in FIGS. 1 and 2, for example) and a total number of target points processed in a predetermined area (45 points in FIGS. 1 and 2, for example). Moreover, it displays the height (UP or DOWN) of the next target point relative to the current position.

On the display screen 11 of FIG. 1, the horizontal angles from 110° to 190° are displayed at every 10° from left to right along an upper side, and the horizontal angles from 300° to 340° (180° off from the horizontal angles on the upper side, where the base station 10 is used as the center) are displayed at every 10° from right to left along a lower side. Scales are displayed corresponding to the horizontal angles.

A collimation line 20 displayed on the display screen 11 is changed with the movement of the operator (mobile station 12).

In FIG. 1, a horizontal angle 150° portion of the display screen 11 is at a position where the base station 10 can be collimated from the mobile station 12 at the current position. A horizontal angle 132° portion (portion indicated by an inverted triangle ▼ at the upper portion of the display screen 11) is at a position where the base station 10 can be collimated from the next target point 13.

The display of the artificial landscape shown at the lower left corner of the display screen 11 shows that the next target point 13 is positioned 15 m diagonally right ahead of the mobile station 12 at the current position.

In the Forward (foreground) mode of FIGS. 1 and 2, the both artificial landscapes show the direction, the distance and the grade to the next target point 13 in the state where the base station 10 is collimated from the mobile station 12 at the current position. Further, the display landscape image displays the direction and the distance.

Figure 3:
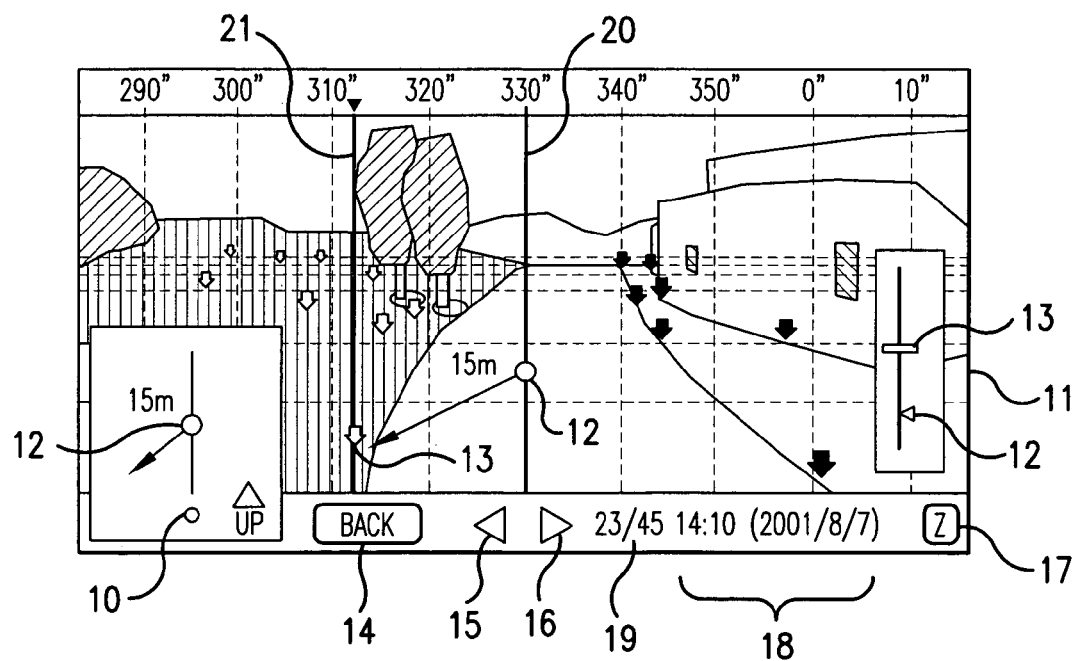
FIG. 3 shows still another display mode example of the display screen of the mobile station according to the present invention. It shows an example of the Back (background) mode display according to the present invention. In other words, it displays the image of the landscape that the operator sees with the base station direction behind him/her, a moving direction and a distance.
Figure 4:
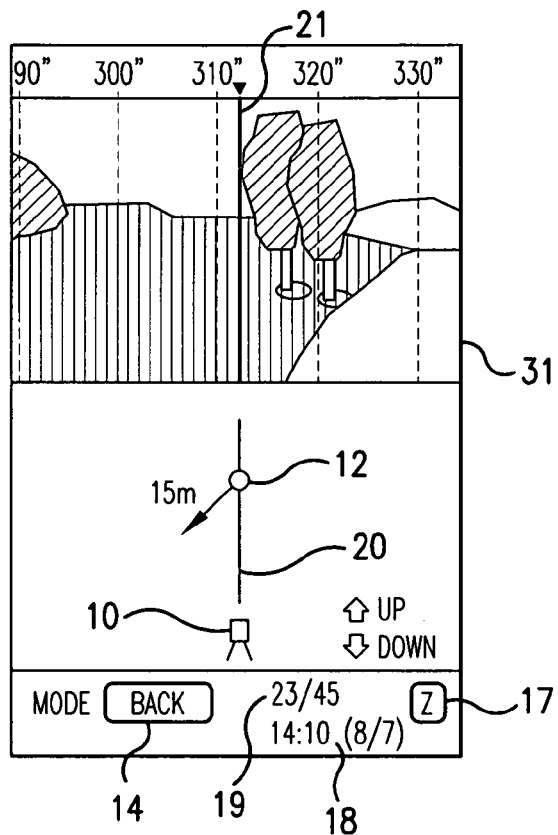
FIG. 4 shows a display example of the Back (background) mode of the display screen of the mobile station according to the present invention when the mode of the display screen in FIG. 2 is switched.
Figure 5:
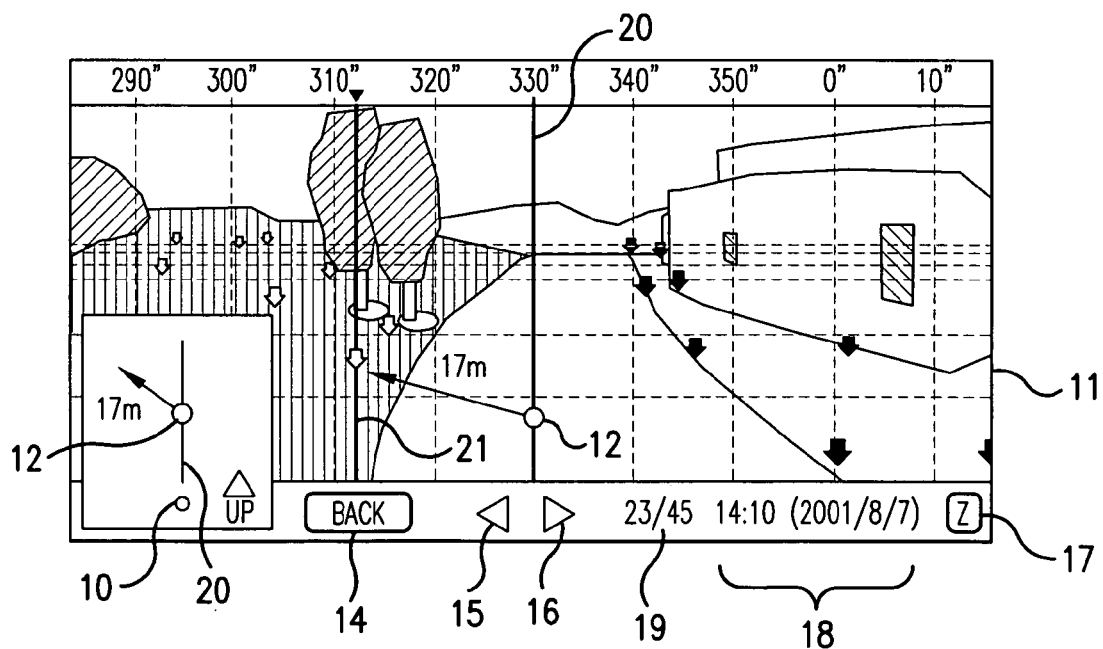
FIG. 5 shows another display example of the Back (background) mode according to the present invention. Specifically, it displays the image of the landscape that the operator sees with the base station direction behind him/her at a different target point from the one of FIG. 3, the moving direction and the distance.

FIGS. 3 to 5 show other 3 examples of the Back (background) mode display in the display screen of the mobile station 12. FIG. 3 displays the same target point as the one in the foreground display of FIG. 1 in the background mode. FIG. 5 displays the target point different from the one in the foreground display of FIG. 1.

FIGS. 2 and 4 show the same display screen 31, and operation of the mode switch button 14 alternately switches the foreground mode of FIG. 2 and the background mode of FIG. 4.

FIGS. 3 to 5 display the image of the landscape that the operator (mobile station 12) sees with the base station 10 behind him/her (that is, background direction), and the direction and the distance that the operator (mobile station 12) should move. They display the direction and the distance of the next target point 13 by the arrow and the numeral using the line of the opposite direction (330°) with the base station 10 behind him/her as a reference.

Constitution is made such that the display transforms into the background mode display automatically or by operation of the mode switch button 14 by the operator if the next target point 13 positions in the opposite direction to the base station 10 seen from the operator of the mobile station 12.

The images of the display screens 11 in FIGS. 3 and 5 are the most detail possible, while the image of the display screen 31 in FIG. 4 is the simplest possible one.

In the both Back (background) mode displays of FIGS. 3 and 5, there are shown the mode switch button 14, the left scroll button 15, the right scroll button 16, the zoom button 17, the time display section 18, and the like. Furthermore, the target point display section 19 displays the target point to be processed next (23rd target point, for example) and a total number of target points processed in a predetermined area (45 points, for example). Moreover, it also displays the grade (UP or DOWN).

FIG. 3 illustrates an example of figure display on the right of the display screen 11 regarding the vertical interval of the mobile station 12 at the current position to the next target point 13.

The current position of the mobile station 12 is displayed in a triangular figure with the height position of the next target point 13 as a reference. Herein, the position of the triangular figure changes according to the changes of the vertical interval between the next target point 13 and the mobile station 12.

The display screens 11 of FIGS. 3 and 5 show the horizontal angles from 290° to 360° (0°) and to 10° are displayed at every 10° from left to right along the upper side. The horizontal angles displayed in the display screen 11 are changed as the operator (mobile station 12) moves toward the next target point.

Both of the foregoing display landscapes are displayed in a photographed image of the imaging means, and are displayed in association with the three-dimensional positional coordinates of an object, which has been actually measured.

Further, by synthesizing a plurality of photographed images based on the direction (horizontal angle) when photographing images, a continuous 360° panoramic landscape image can be formed.

With the operator's operation, the panoramic landscape image can be freely scrolled.

The operator is capable of measuring the three-dimensional positional coordinates of the mobile station 12, which he/she possesses, at an arbitrary place by his/her instruction.

When displaying the target point where pile-driving or positional measurement is performed, different display is performed according to each status of "unprocessed", "to be processed next" and "processed". Particularly, the target point to be processed next blinks on and off or the like to call attention. With such a display mode, the operator can visually confirm all the target points within the field of vision and the status of each target point, so that the direction and the distance to move is understood easier when indicating the position of the next target point for the operator at work.

The display means has a function to virtually create the three-dimensional display and a function to associate and synthesize the photographed image with its virtual three-dimensional image.

Figure 6:
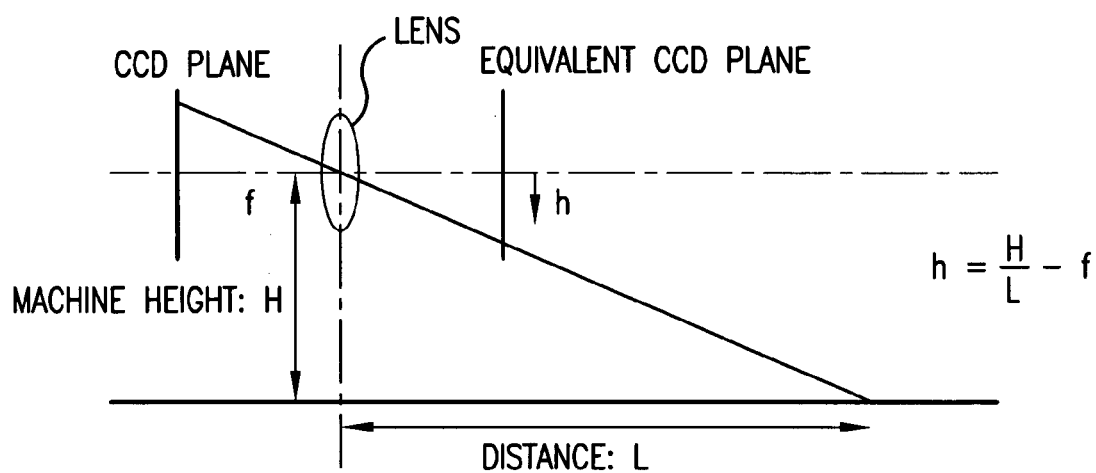
FIG. 6 is a view for explaining the position and the distance on a CCD of the base station according to the present invention.
Figure 7:
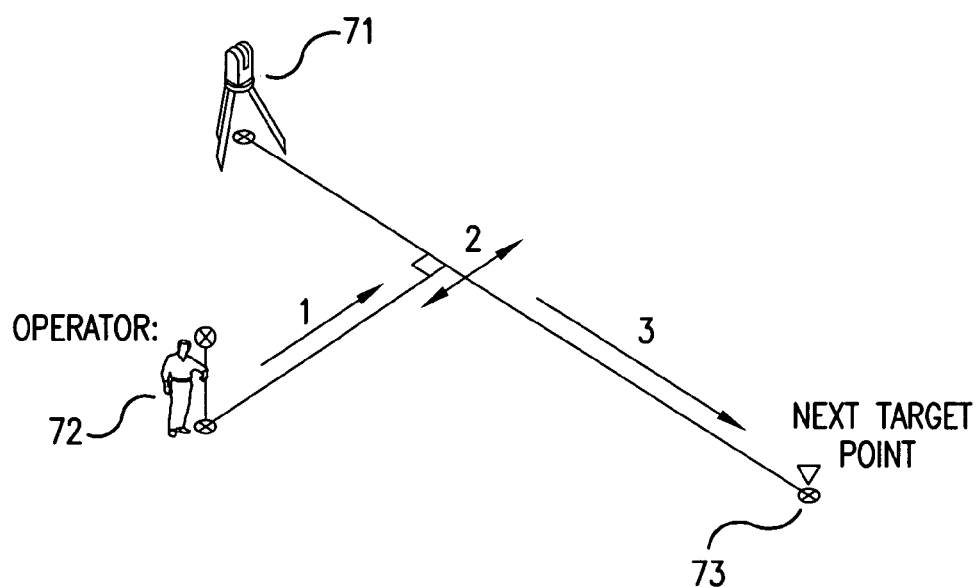
FIG. 7 shows an operator guiding system in a conventional positioning operation.

As shown in FIG. 6, the depth direction position h on the image in the function to synthesize the coordinates data with the photographed image data is calculated by the following expression based on the distance data L of the coordinates data, the machine height H, and the focal distance f of the imaging means.

$$H = Hf/L$$

The machine height H is calculated using the default value (1.5 m for example). The machine height H is actually measured and input.

The base station 10 has a function to transfer the photographed image to the display means of the mobile station 12 by the communication means (such as optical communication and radio communication) or the storage medium (such as compact flash (registered trademark) memory and SD chip). The communication means transmits the coordinates data measured to the display means of the mobile station 12.

Figure 8:
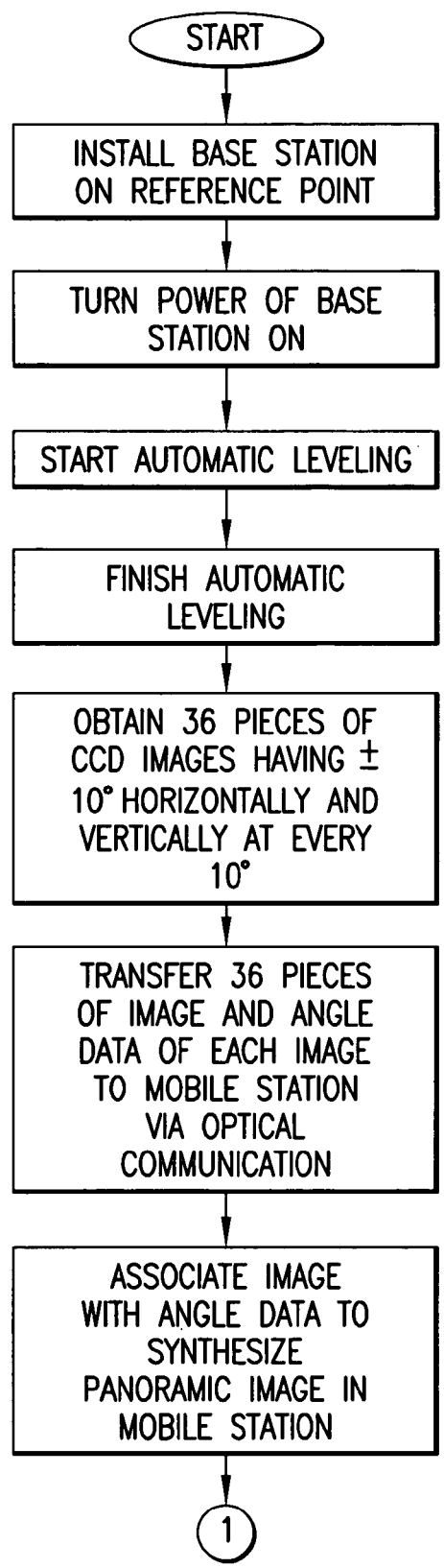
FIG. 8 shows an example of an operational flow halfway when the operator guiding system of the present invention is used.
Figure 9:
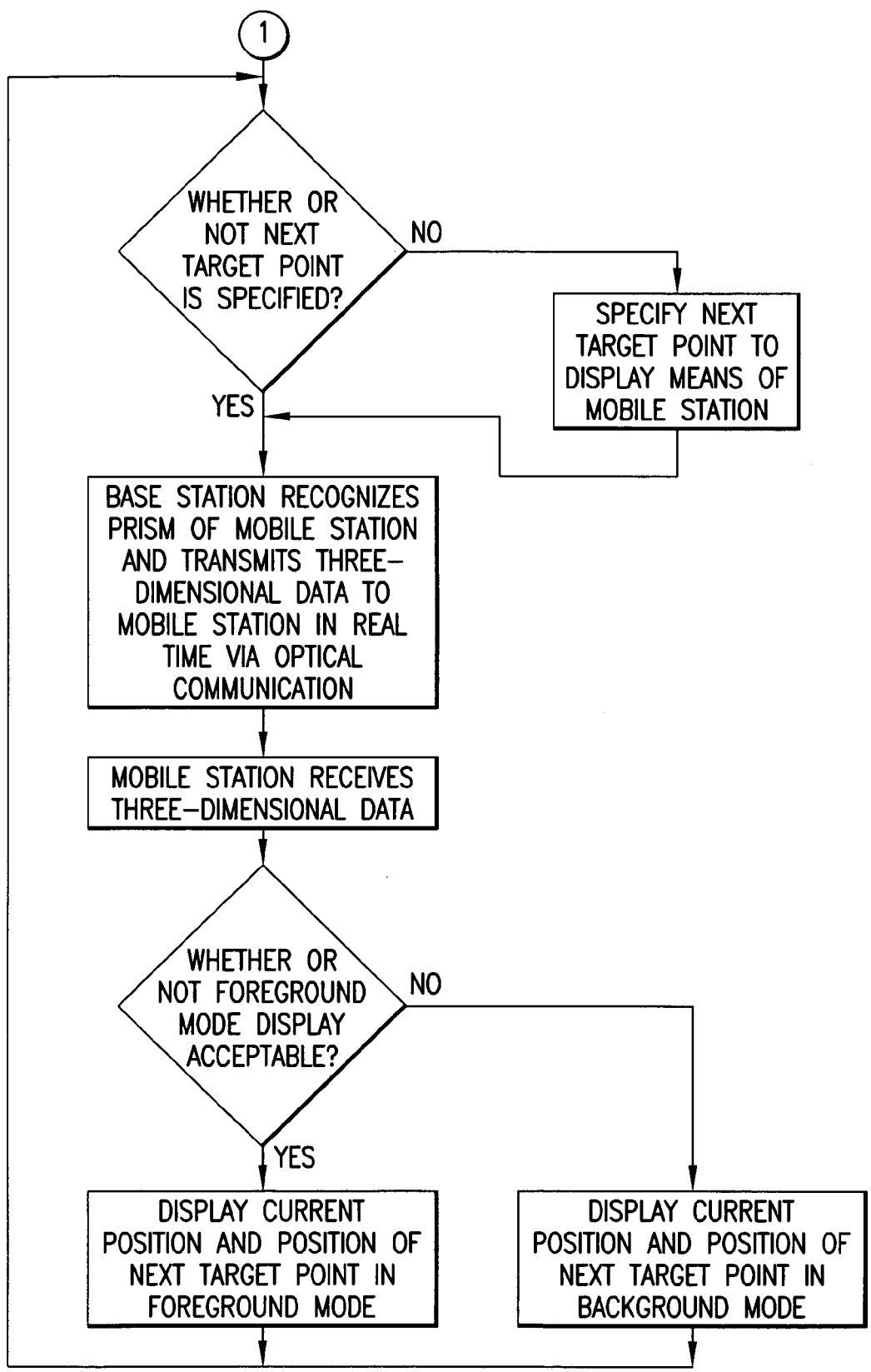
FIG. 9 shows the operational flow continued from FIG. 8.

FIGS. 8 and 9 show an example of the operational flow when the operator guiding system shown in FIGS. 1 to 4 is used.

Refer to FIG. 8 first.

The base station 10 is installed in a predetermined area where a large number of target points are studded. Specifically, the base station 10 is installed at a reference point (substantially at the center of a large number of target points) in the predetermined area.

Power of the base station 10 is turned ON to start leveling by the equipment main body of the base station 10. After necessary automatic leveling has finished, the imaging means of the base station 10 photographs the 360° panoramic landscape around the station and stores it. For example, it obtains 36 pieces of the CCD images having ±10° horizontally and vertically at every 10°. The display screens 11, 31 of the display means of the mobile station 12 display these images and angle data.

The 36 pieces of the CCD images and the angle data of each image are transferred to the mobile station 12.

The mobile station 12 associates the images with the angle data to synthesize and create the panoramic image, which is displayed on the display screens 11, 31 of the display means.

Refer to FIG. 9 next.

The operator, looking into the display screens 11, 31 of the mobile station 12, confirms whether or not the next target point is specified. When it is specified, he/she proceeds to the next step. If it is not specified, the operator specifies the next target point to the display means of the mobile station 12 to proceed to the next step.

The base station 10, recognizing the prism of the mobile station 12, transmits the three-dimensional data via optical communication in real time to the mobile station 12.

The mobile station 12 receives the three-dimensional data.

The operator selects to display either the Forward (foreground) mode or the Back (background) mode for the image to be displayed on the display means of the mobile station 12 based on the contents of data received.

When the operation at the next target point has finished, the same procedure is repeated for the target point after the next one.

What is claimed is:

1. An operator guiding system for guiding an operator when the operator moves with a mobile station around a base station installed, the base station including imaging means, distance measurement means for measuring a distance between the base station and the mobile station, and angle measurement means for detecting a photographing direction of the imaging means, in such a way that the base station serves as a positional coordinate measurement unit, the mobile station including display means, for displaying a landscape seen from the base station, wherein the landscape displayed by the display means of the mobile station is based on landscape data obtained by the imaging means of the base station and the angle measurement means of the base station as well as positional coordinate data of the mobile station, which are obtained by the positional coordinate measurement unit, wherein the display means of the mobile station displays a direction and a distance from a current position of the mobile station to a next target point in addition to, and together with a landscape image displayed on the display means of the mobile station, on the basis of the construction plan data stored in the mobile station, and the landscape data obtained by the imaging means of the base station and the angle measurement means of the base station and the positional coordinate data of the mobile station, which is obtained by the positional coordinate measurement unit.

2. An operator guiding system according to claim 1, wherein the display means of the mobile station displays a landscape seen from the mobile station at a predetermined position toward the base station or in a direction making 180° with the direction toward the base station.

3. The operator guiding system according to claim 1 wherein the predetermined position is positional coordinates of a next target point in the construction plan data.

4. The operator guiding system according to claim 1 wherein a target line is displayed at a horizontal angle position in a direction where the base station is collimated from a next target point, or a direction making 180° with the direction where the base station is collimated, on the landscape data.

5. The operator guiding system according to claim 1 wherein the predetermined position is a current position of the mobile station, which is measured by the angle measurement means and the distance measurement means of the base station.

6. The operator guiding system according to claim 1 wherein a collimation line is displayed at a current position on the landscape data in a collimation direction from the base station.

7. The operator guiding system according to claim 6, wherein a landscape is displayed with a target line arranged at the center.

8. The operator guiding system according to claim 7, wherein the target line is displayed in the same image as the one where the collimation line is displayed.

9. The operator guiding system according to claim 8, wherein
an arrow is displayed in a direction from the collimation line to the target line.

10. The operator guiding system according to claim 1, wherein the display means of the mobile station displays scales of horizontal angles.

11. The operator guiding system according to claim 10, wherein
the display means of the mobile station displays scales of distance.

12. The operator guiding system according to claim 11, wherein the landscape data is created in such a way that a predetermined point on the photographed image data is associated with three-dimensional coordinates.

13. The operator guiding system according to claim 1 wherein
a plurality of photographed images are synthesized to form a panoramic image in a photographing direction from the imaging means, and the panoramic image is displayed as landscape data at the mobile station.

14. The operator guiding system according to claim 13, wherein positional coordinates of the target point on the construction plan data are associated with positional coordinates on the landscape data so as to display the target point on the landscape data.

15. The operator guiding system according to claim 1, wherein a current position is associated with positional coordinates on landscape data to display the current position on the landscape data.

16. The operator guiding system according to claim 1, wherein the display means of the mobile station displays a relative positional relation between at least a next target point and a current position of the mobile station based on the current position of the mobile station, which are measured by the angle measurement means and the distance measurement means of the base station.

17. The operator guiding system according to claim 16, wherein the relative positional relation among the base station, the current position of the mobile station, and a next target point are artificially displayed.

18. The operator guiding system according to claim 16, wherein the relative positional relation between at least the next target point and the current position of the mobile station is displayed three-dimensionally.

19. The operator guiding system according to claim 1, wherein the display means of the mobile station displays 3 types of target points that are: a next target point; a target point before processing; and a target point where processing has been finished, on the basis of the current position of the mobile station measured by the base station and the construction plan data stored in the mobile station.

20. The operator guiding system according to claim 1, wherein,
in case a next target point is positioned in a direction toward the base station seen from the mobile station, a mode of the display means is defined as a foreground mode, and in case the next target point is positioned in the opposite direction to the base station, a mode of the display means is defined as a background mode, wherein the foreground mode and the background mode are automatically switched.

21. The operator guiding system according to claim 1, wherein a height of a next target point from current position is displayed.

22. The operator guiding system according to claim 13, wherein the landscape displayed is arbitrarily scrollable.

23. The operator guiding system according to claim 1, wherein, when coordinates data is synthesized with photographed image data, a position h in a vertical direction, which uses a position corresponding to a level line on the image data as a reference, is found by the expression:

$$h = Hf/L$$

where L is distance data of the coordinates data, H is a machine height and f is a focal distance of the imaging means.

24. An operator guiding system for guiding an operator when the operator moves with a mobile station around a base station installed,
the base station including an imaging unit, a distance measurement unit configured to measure a distance between the base station and the mobile station, and an angle measurement unit configured to detect a photographing direction of the imaging unit, in such a way that the base station serves as a positional coordinate measurement unit, the mobile station including a display unit, configured to display a landscape seen from the base station, wherein the landscape displayed by the display unit of the mobile station is based on landscape data obtained by the imaging unit of the base station and the angle measurement unit of the base station as well as positional coordinate data of the mobile station, which are obtained by the positional coordinate measurement unit,
wherein the display unit of the mobile station displays a direction and a distance from a current position of the mobile station to a next target point in addition to, and together with a landscape image displayed on the display unit of the mobile station, on the basis of construction plan data stored in the mobile station, and the landscape data obtained by the imaging unit of the base station and the angle measurement unit of the base station and the positional coordinate data of the mobile station, which is obtained by the positional coordinate measurement unit.

* * * * *